United States Patent
Lohmann et al.

(10) Patent No.: US 6,202,415 B1
(45) Date of Patent: Mar. 20, 2001

(54) METHOD AND DEVICE FOR MONITORING THE FUNCTIONING OF TWO EXHAUST-GAS TURBOCHARGERS

(75) Inventors: Andrea Lohmann, Stuttgart; Michael Baeuerle, Markgroeningen; Klaus Ries-Mueller, Bad Rappenau, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/356,208

(22) Filed: Jul. 16, 1999

(30) Foreign Application Priority Data

Jul. 16, 1998 (DE) .............................. 198 32 020

(51) Int. Cl.$^7$ ................................ F02B 33/44
(52) U.S. Cl. .................. 60/612; 123/692; 123/691; 701/110; 701/111; 701/109; 73/117.3
(58) Field of Search .................. 60/612; 701/110, 701/109, 111; 73/117.3; 123/691, 692, 688

(56) References Cited

U.S. PATENT DOCUMENTS

| | | | |
|---|---|---|---|
| 2,199,259 | * 4/1940 | Hersey | 60/612 |
| 4,548,039 | * 10/1985 | Dinger et al. | 60/612 |
| 5,090,204 | * 2/1992 | Bonitz et al. | 60/612 |
| 5,247,793 | * 9/1993 | Yamada et al. | 123/692 |
| 5,263,365 | * 11/1993 | Muller et al. | 73/117.3 |
| 5,267,548 | * 12/1993 | Rosenzopf et al. | 123/692 |
| 5,822,710 | 10/1998 | Mezger et al. | 701/110 |
| 5,845,495 | 12/1998 | Schray et al. | 60/612 |
| 5,861,553 | * 1/1999 | Janetzke et al. | 73/117.3 |
| 6,050,250 | * 4/2000 | Kerkau | 123/692 |

FOREIGN PATENT DOCUMENTS

| | | | |
|---|---|---|---|
| 41 38 765 | 7/1992 | (DE) . | |
| 195 13 156 | 5/1996 | (DE) . | |
| 2 064 171 | * 6/1981 | (GB) | 123/692 |
| 352044317 | * 4/1977 | (JP) | 60/612 |

* cited by examiner

*Primary Examiner*—Thomas Denion
*Assistant Examiner*—Thai-Ba Trieu
(74) *Attorney, Agent, or Firm*—Kenyon & Kenyon

(57) ABSTRACT

A separate irregular-running determination is carried out for each cylinder bank. Each ascertained irregular-running value is compared to a lower and an upper threshold value, the upper threshold value being set in such a way that all irregular-running values below it are not caused by combustion misses. A defect is signaled in one of the exhaust trains when, for at least one of the two cylinder banks, an irregular-running value is ascertained lying between the lower and the upper threshold value, and the difference between the irregular-running values of the two cylinder banks exceeds a threshold. This method makes it possible to ascertain a defect in one of the two cylinder banks very early.

5 Claims, 2 Drawing Sheets

METHOD AND DEVICE FOR MONITORING THE FUNCTIONING OF TWO EXHAUST-GAS TURBOCHARGERS

BACKGROUND INFORMATION

German Patent No. 1 95 13 156 describes an internal combustion engine, composed of two cylinder banks, in which each cylinder bank has its own exhaust-gas turbocharger. By controlling the exhaust-gas turbines arranged in the exhaust trains of the two cylinder banks, the boost pressure in the shared intake train of the two cylinder banks is controlled to a setpoint value. If at this point, a fault occurs in one of the two exhaust trains, for example, the catalytic converter becomes clogged, or there is a defect in the boost pressure controller, or a malfunction of the exhaust-gas turbine, etc., this becomes noticeable by different rotational frequencies of the two exhaust-gas turbochargers. Namely, the control circuit will compensate for the system deviation of the boost-pressure actual value compared to the boost-pressure setpoint value, caused by the fault occurring on one side, by an upward adjustment of the turbocharger on the fault-free side. In so doing, the rotational frequency of the turbocharger can reach a critical value which results in its destruction.

To rule out the destruction of a turbocharger in the event of a fault, according to German Patent No. 195 13 156, provision is made for a fault-detection device which, when it detects a fault on one side in one of the two exhaust trains, interrupts the closed-loop charging control and switches over to an open-loop control. The open-loop control is designed in such a way that the turbocharger does not enter into its critical rotational-frequency range. For example, the fault-detection circuit detects engine misfirings in the two cylinder banks. In so doing, it determines the rate of occurrence of engine misfirings for the individual cylinder banks and, if the rate of occurrence exceeds a predefined limiting value, it signals that a fault exists on one side in one of the two exhaust trains.

A longer time can pass until a defect in one of the two exhaust trains leads to engine misfirings in one of the cylinder banks, during which time the control circuit will already have adjusted one of the two exhaust-gas turbochargers into a critical rotational-frequency range. Therefore, an object of the present invention is to provide a method and a device for monitoring the functioning of two exhaust-gas turbochargers that belong to two separate cylinder banks of an internal combustion engine, which makes it possible to detect a defect in one of the exhaust trains as quickly as possible, so that appropriate protective measures can be initiated for the turbochargers.

SUMMARY OF THE INVENTION

In the method and device according to the present invention, a determination of irregular running is carried out for each cylinder bank, the irregular-running values ascertained in each case are compared to a lower and an upper threshold value, and the upper threshold value is regulated in such a way that all irregular-running values below it are not caused by combustion misses. A defect in the exhaust train is signaled when an irregular-running value lying between the lower and the upper threshold value is determined for at least one of the two cylinder banks, and the difference between the irregular-running values of the two cylinder banks exceeds a threshold. Using this method or a device implementing this method, a defect is already detected in a timely manner, long before engine misfirings occur.

Instead of subjecting the absolute irregular-running values to a threshold-value decision, irregular-running values averaged over several ignition cycles can also be supplied to the threshold-value decision element.

The method of the present invention also makes it possible to decide which of the two turbochargers is defective. Namely, according to the method, that turbocharger is classified as defective which belongs to a cylinder bank for which an irregular-running value has been determined that lies between the lower and the upper threshold value and is greater than an irregular-running value ascertained for the other cylinder bank.

A plausibility check for a detected defect in an exhaust train can be carried out by comparing the signals from lambda probes, arranged in the exhaust channels of the two cylinder banks, to one another, and drawing upon an amount of deviation between the two lambda probe signals exceeding a predefined limiting value as the plausibility criterion.

DETAILED DESCRIPTION

Figure 1:
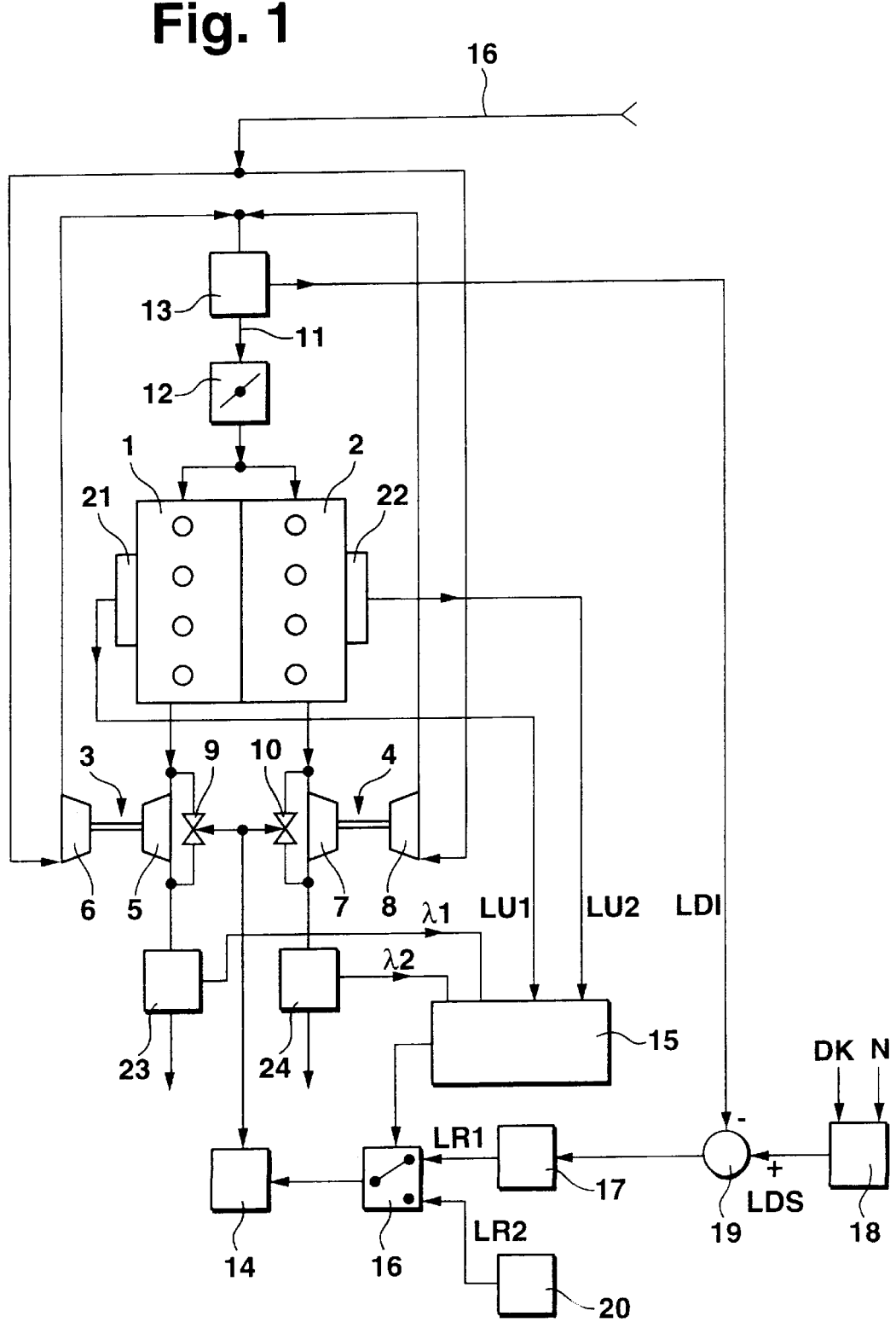
FIG. 1 shows a block diagram of an internal combustion engine having two exhaust-gas turbochargers.

FIG. 1 shows an internal combustion engine having two cylinder banks 1 and 2. Each of these two cylinder banks 1 and 2 is provided with an exhaust-gas turbocharger 3 and 4. Exhaust-gas turbocharger 3 has a turbine 5 in the exhaust channel of first cylinder bank 1 and a compressor 6, coupled to it, in the intake train. In the same manner, a turbine 7 of second exhaust-gas turbocharger 4 is arranged in the exhaust channel of second cylinder bank 2 and a compressor 8, coupled to it, is arranged in the intake train. Turbines 5 and 7 of both turbochargers 3 and 4 are each equipped in known manner with a bypass valve 9 and 10. These bypass valves 9 and 10 provide the possibility of regulating the boost pressure produced by each turbocharger 3, 4 to a desired value. Compressors 6 and 8 of both turbochargers 3 and 4 feed their charge air into a shared intake port 11, in which are located a throttle valve 12 and an air-pressure sensor 13 for measuring the boost pressure. At the outlet of throttle valve 12, intake port 11 branches off to both cylinder banks 1 and 2. However, a separate intake port having its own throttle valve and a boost-pressure sensor can also be provided for each cylinder bank, A final controlling element 14, e.g., a frequency (clock pulse) valve, drives both bypass valves 9 and 10 of turbochargers 3 and 4 simultaneously. The boost pressure of both turbochargers 3 and 4 can also be regulated by the geometry of turbines 5, 7, instead of by bypass valves 9 and 10.

A fault-detection device 15 is provided which monitors the functioning of both exhaust-gas turbochargers and detects whether a defect has occurred in one of the two turbochargers, e.g., due to a clogged catalytic converter. If both exhaust-gas turbochargers 3 and 4 are functioning flawlessly, fault-detection device 15 brings a switch 16 into such a position that a boost-pressure controller 17 is connected through to the input of controlling element 14. Thus, in this faultless case, the boost pressure of both turbochargers 3 and 4 is regulated by a closed-loop control circuit with controller 17 (e.g., PDI controller). Controller 17 receives as an input signal the amount of deviation between a boost-pressure actual value LDI, which is measured by air-pressure sensor 13, and a boost-pressure setpoint value LDS which is predefined by a setpoint generator 18. Setpoint generator 18 is a characteristics map which is a function of throttle-valve position DK (or the gas pedal position) and engine speed N. The amount of deviation between boost-pressure actual value LDI and boost-pressure setpoint value LDS is determined in node 19.

If at this point, fault-detection device 15 has detected a fault, it then brings switch 16 into a second position, so that instead of controller 17, an open-loop control or a different automatic controller 20 is connected through to the input of controlling element 14. This open-loop control or second closed-loop control 20 prevents the one turbocharger which is still functioning flawlessly from accelerating into its critical rotational-frequency range.

The fault-detection method in device 15 is based on the evaluation of irregular-running values LU1 and LU2 ascertained from individual cylinder banks 1 and 2. Indicated in FIG. 1 at each cylinder bank 1 and 2 are blocks 21 and 22 in which irregular-running values LU1 and LU2 are ascertained. The detailed description of a method for ascertaining the irregular running of an engine will be dispensed with here, since there are a number of methods known from the related art (e.g. German Patent No. 41 38 765 A1) which are applicable in this case. Output signals $\lambda 1$ and $\lambda 2$ from lambda probes 23 and 24 located in the individual exhaust channels can also be processed in fault-detection device 15 to detect a fault.

Figure 2:
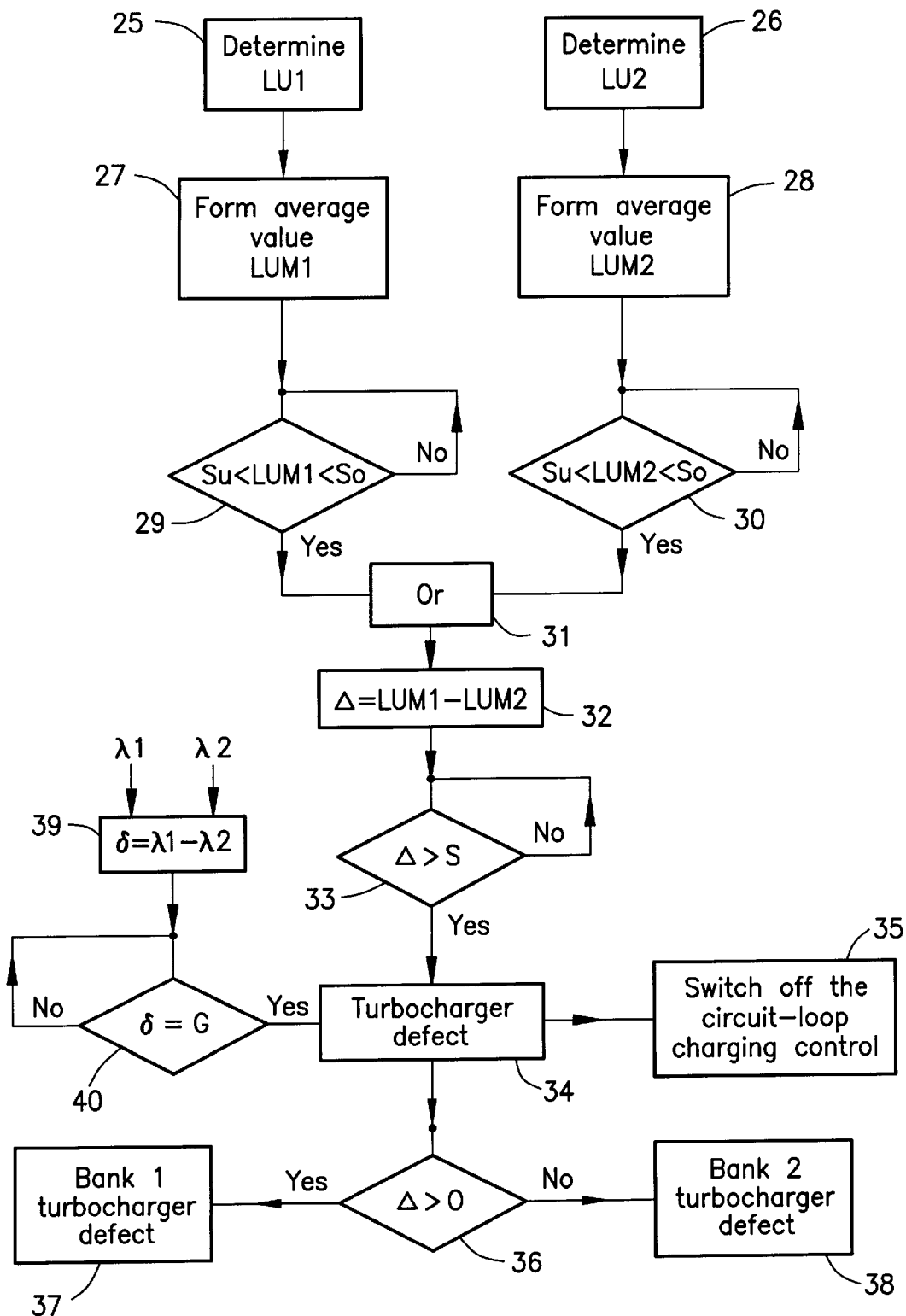
FIG. 2 shows a flow chart for a method of monitoring the functioning of the two exhaust-gas turbochargers.

The method, proceeding in fault-detection device 15, for detecting a defect in an exhaust train shall be explained in greater detail in the following with reference to the flow chart shown in FIG. 2.

Irregular runnings LU1 and LU2 for each of the two cylinder banks are first ascertained separately in method steps 25 and 26. The irregular running of a cylinder bank indicates, namely, that the associated turbocharger or another device in an exhaust train is defective (in the following, only a defect is spoken of in this connection). A defect produces an exhaust backpressure in the engine, which causes a change in the cylinder charge that becomes noticeable as irregular running. In the next method steps 27 and 28, an irregular-running value LUM1 and LUM2, averaged over several ignition cycles, is formed for each cylinder bank. The further method is now carried out using the averaged irregular-running values LUM1 and LUM2. However, it is also possible to continue using the concretely measured, and not the averaged irregular-running values LU1 and LU2.

In the following method steps 29 and 30, the two averaged irregular-running values LUM1 and LUM2 for the two cylinder banks are subjected to a threshold-value decision. From the threshold-value decision, information is only transmitted to an OR operation 31 when the average irregular-running value LUM1 and LUM2, respectively, is greater than a lower threshold value Su and less than an upper threshold value So. Lower threshold value Su is set in such a way that it is possible to assume that an irregular running exceeding it can also actually be traced back to a defect. Upper threshold value So is set in such a way that all irregular-running values below it still do not have their cause in combustion misses. Intended to be achieved by these threshold-value decisions 29 and 30 is that not only such irregular runnings which can be attributed to ignition misfirings are associated with a defect. Thus, using the described method, insignificant irregular runnings are already detected, from which a defect is deduced. Therefore, a defect is detected much earlier than if the decision about the presence of a defect were first made dependent upon irregular runnings due to combustion misses.

As soon as at least one of the two average irregular-running values LUM1 and LUM2, respectively, lies within the two thresholds Su and So, after the OR operation 31, the difference $\Delta$ between the two average irregular-running values LUM1 and LUM2 is formed in the following method step 32. In method step 33, it is checked whether this difference $\Delta$ exceeds a predefined threshold S. Only when this is the case, thus when the average irregular-running values LUM1 and LUM2 of the two cylinder banks clearly differ from one another, is a defect decided in method step 34. The difference formation between the two average irregular-running values LUM1 and LUM2 indicates with certainty that a defect must exist in one of the two exhaust trains. If, at this point, it has been decided in method step 34 that there is a defect, then, as already described in connection with FIG. 1, in method step 35, the normal closed-loop charging control is switched off, and at the same time there is a switchover to a different closed-loop control or an open-loop control.

Based on the difference formation $\Delta$ between the two average irregular-running values LUM1 and LUM2, it becomes recognizable which of the two turbochargers must be defective. To that end, it is determined in method step 36 whether difference $\Delta$ is greater or less than 0. If difference $\Delta$ is greater than 0, cylinder bank 1 has a greater average irregular running LUM1 than cylinder bank 2. This in turn means that a greater exhaust backpressure has developed in cylinder bank 1 because of a turbocharger defect. Otherwise, if difference $\Delta$ is less than 0, a defect must exist in the turbocharger of cylinder bank 2. Thus, given a difference $\Delta$ greater than 0, in step 37, a defect of the turbocharger in cylinder bank 1 is decided, and in response to a difference $\Delta$ which is less than 0, in step 38, a defect of the turbocharger in cylinder bank 2 is decided.

The decision in method step 34 about a defect can be additionally safeguarded by a plausibility check. In this plausibility check, output signals $\lambda 1$ and $\lambda 2$ of lambda probes 23 and 24 located in the exhaust channels of the two cylinder banks are subjected in method step 39 to a difference formation. In method step 40, it is checked whether a certain asymmetry exists between lambda-probe signals $\lambda 1$ and $\lambda 2$, i.e., whether the difference $\delta$ is greater than a limiting value G. If this is the case, this information is taken into consideration during the decision about a defect.

What is claimed is:

1. A method for monitoring a functioning of first and second exhaust-gas turbochargers associated with first and second separate cylinder banks, respectively, of an internal combustion engine, comprising the steps of:

determining first and second irregular-running values for the first and second cylinder banks, respectively;

comparing each of the first and second irregular-running values to a predetermined lower threshold value and a predetermined upper threshold value, the upper threshold value being predetermined such that all irregular-running values less than the upper threshold value are not caused by combustion misses;

indicating a defect in an exhaust train when (a) at least one of the first and second irregular-running values lies between the lower and upper threshold values, and (b) a difference between the first and second irregular-running values exceeds a difference threshold value.

2. The method according to claim 1, further comprising the step of determining first and second average irregular-running values for the first and second cylinder banks, respectively, the first and second average irregular-running values being values averaged over a plurality of ignition cycles.

3. The method according to claim 1, wherein the defect is indicated when one of the first and second irregular-running values lies between the lower and upper threshold values and is greater than another one of the first and second irregular-running values.

4. The method according to claim 1, further comprising the steps of:

comparing, to one another, signals from two lambda probes situated in exhaust channels of the first and second cylinder banks; and using an amount of deviation between the two lambda-probe signals exceeding a further threshold value as a plausibility criterion for a detected defect in one of two exhaust trains.

5. A device for monitoring a functioning of first and second exhaust-gas turbochargers associated with first and second cylinder banks, respectively, of an internal combustion engine, comprising:

means for separately determining first and second irregular-running values for the first and second cylinder banks, respectively;

threshold-value decision elements for comparing each of the first and second irregular-running values to a predetermined lower threshold value and a predetermined upper threshold value, the upper threshold value being predetermined such that all irregular-running values less than the upper threshold value are not caused by combustion misses; and a comparator for comparing the first irregular-running value lying between the lower and upper threshold values to the second irregular-running value and for indicating a defect in an exhaust train when a difference between the first and second irregular-running values exceeds a difference threshold value.

* * * * *